Dec. 8, 1953     J. P. K. FONTAINE     2,661,960
PIVOTALLY MOUNTED FIFTH WHEEL PLATE
Filed June 9, 1951     2 Sheets-Sheet 1

INVENTOR.
JOHN P.K. FONTAINE
BY
*Jennings & Carter*
ATTORNEYS

Dec. 8, 1953  J. P. K. FONTAINE  2,661,960
PIVOTALLY MOUNTED FIFTH WHEEL PLATE
Filed June 9, 1951  2 Sheets-Sheet 2

INVENTOR.
JOHN P. K. FONTAINE
BY
ATTORNEYS

Patented Dec. 8, 1953

2,661,960

UNITED STATES PATENT OFFICE 2,661,960

PIVOTALLY MOUNTED FIFTH WHEEL PLATE

John P. K. Fontaine, Birmingham, Ala.

Application June 9, 1951, Serial No. 230,787

2 Claims. (Cl. 280—438)

My invention relates to apparatus for coupling a trailer to a tractor and has for an object the provision of such apparatus embodying improved means for supporting the apparatus for pivotal movement relative to the vehicle on which the same is mounted.

Heretofore in the art to which my invention relates, the fifth wheel plate and its associated mechanism has been supported by means of relatively short brackets and a cross shaft or stub shafts passing therethrough and fitting at the ends in brackets mounted on the tractor. In many prior art constructions the supporting shaft has been welded to the bracket carried by the fifth wheel plate with the result that the ends of the shaft have been free to rock in the shaft bearings of the brackets mounted on the tractor. In all prior apparatus so far as I am aware the bearing area for the shaft in both sets of brackets has been so small that excessive wear occurred on the brackets which rotated relative to the shaft. This deficiency has resulted in short life for the bearings and the brackets, the development of looseness in the coupling and thus the necessity of frequent and expensive repairs to the apparatus.

In view of the foregoing the principal object of my invention is to minimize the above difficulties by the provision of an elongated bearing on the fifth wheel plate extending completely across the apparatus, between the brackets carried by the tractor, the shaft being secured non-rotatably in the tractor brackets, together with grease seals at the ends of the bearing effective to retain a supply of grease therein, around the shaft.

A further object is to provide towing apparatus of the character designated which shall be simple of construction, economical and which shall have long, trouble free life.

Apparatus embodying the features of my invention is shown in the accompanying drawings forming a part of this application in which.

Figure 1:
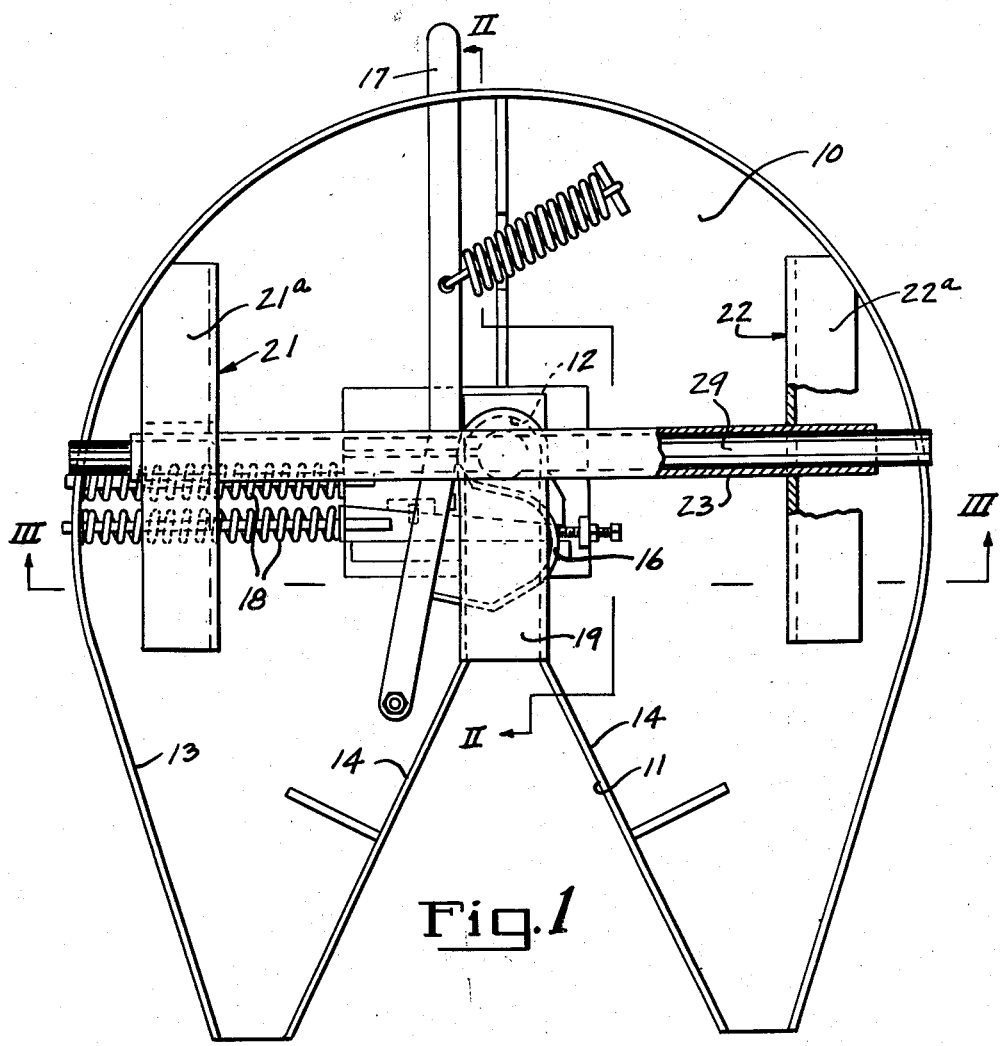
Fig. 1 is a view looking at the underside of towing apparatus embodying my invention.
Figure 2:
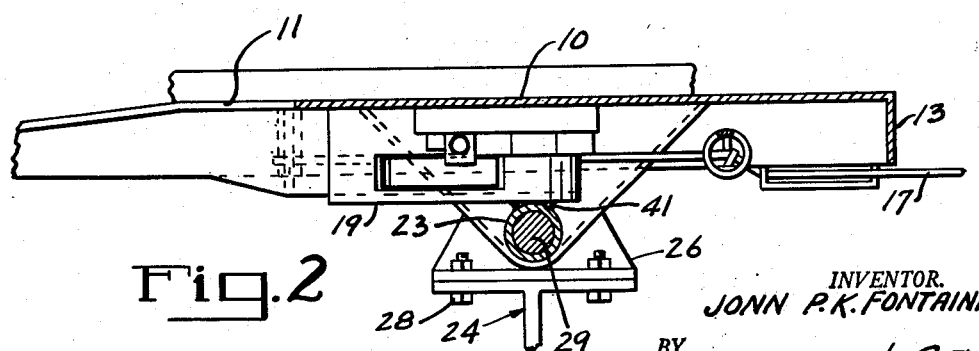
Fig. 2 is a detail sectonal view taken generally along line II—II of Fig. 1 and with the apparatus turned over so that Fig. 2 shows the same in upright, operating position.
Figure 3:
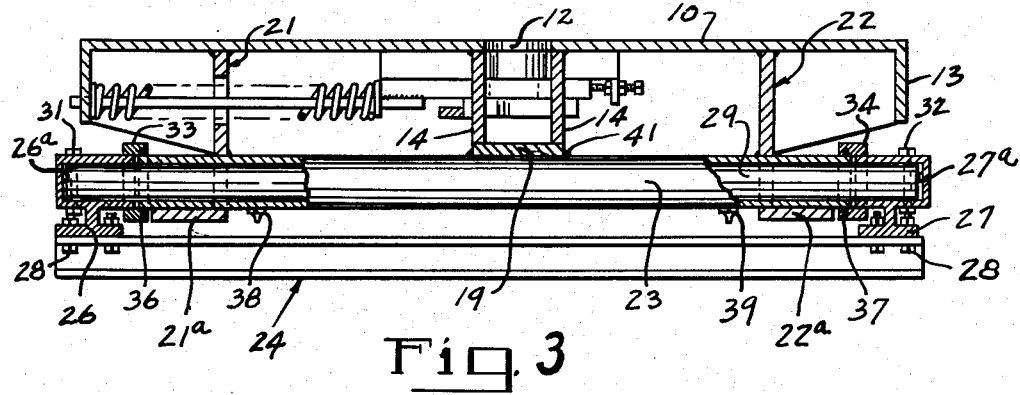
Fig. 3 is a view taken generally along line of III—III of Fig. 1 and also showing the apparatus in operative position and mounted on the supporting brackets, in turn carried by the tractor; and, Fig. 4 is an enlarged detail sectonal view through one of the supporting brackets on the tractor and the adjacent end of the elongated bearing.
Figure 4:
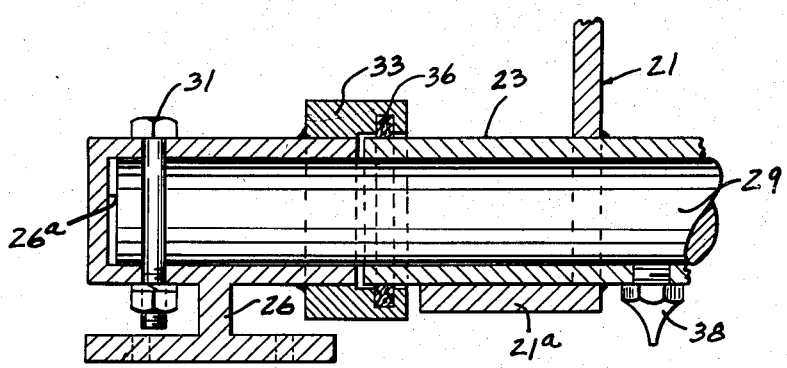

Referring now to the drawings for a better understanding of my invention, I show the same in association with a trailer coupling of the type shown, described and claimed in Patent No. 2,456,826, issued on December 21, 1948, to Arnoldus S. Brumby and myself. As the description thereof proceeds, however, it will be apparent that my invention may be associated with a large number of different types of coupling apparatus of the general type exemplified by the above identified patent.

The coupling comprises a fifth wheel plate 10. In the plate 10 is provided a lateral, flaring opening 11 terminating in a U-shaped slot 12 adapted to receive a king-pin, not shown, carried by the trailer. The plate 10 is provided with depending reinforcing flanges 13 around its outer periphery. Also, the edges of the opening 11 are reinforced by flanges 14 which depend below the level of the plate 10. The flanges 14 extend around the entire periphery of the opening 11 and are joined across their lower edges by a plate 19.

The apparatus is provided with a suitable form of means for locking the king pin in place in the slot. In the drawings, this element is indicated as a member 16 which may be moved manually to unlocking position by means of a lever 17. Springs 18 serve to bias the member into locking position.

Secured to the underside of the plate 10 as by welding are brackets 21 and 22. These brackets may be in the shape of angles with the legs 21a and 22a thereof turned outwardly. Passing through the vertical legs of the brackets 21 and 22 and welded thereto is a length of tubing 23. The ends of the tubing 23 project past the ends of the legs 21a and 22a of the angles.

Mounted on a portion of the tractor frame structure indicated generally and diagrammatically by the numeral 24 are brackets 26 and 27. These brackets may be secured to a mounting plate by means of bolts 28 in turn secured to the tractor frame. The brackets 26 and 27 are provided with inwardly directed socket portions 26a and 27a, respectively. Passing through the tube 23 and with its ends projecting into the sockets 26a and 27a is a length of shaft 29. The shaft may be held against rotation and shifting in the brackets 26 and 27 by means of bolts 31 and 32.

The shaft 29 holds the ends of the tube 23 in axial alignment with the socket portions of the brackets 26 and 27. Secured to the ends of the socket portions 26a and 27a are grease seal units 33 and 34. The units 33 and 34 may be provided with annular sealing gaskets 36 and 37 of flexible material which fit closely about the projecting ends of the tube 23. A supply of lubricant may be forced into the tube 23 through grease fittings 38 and 39, thereby to lubricate the relatively moving shaft 29 and tube 23.

In order to eliminate the deflection of tube 23 and shaft 29 I may secure the tube 23 adjacent its center to the plate 19 as by welding the same thereto as indicated at 41.

From the foregoing the method of constructing my improved towing apparatus and the advantages thereof may now be readily explained and understood. It will be seen that the long tube 23 with the shaft mounted therein provides a bearing which is substantially as long as the width of the entire apparatus. Since the bolts 31 and 32 hold the shaft 29 against rotation, the relative rotation of the parts occurs between the shaft 29 and the long tube bearing 23. By this means I have greatly reduced the unit stresses on the bearings and have assured long, trouble free life for this part of the apparatus. By maintaining a supply of lubricant in the tube 23 and by preventing the leakage thereof and ingress of dirt thereinto by means of the seals 33 and 34, my improved apparatus has unusually long life. Furthermore, when it is necessary to replace the tube 23 it is quite easy to cut the welds joining the same to the brackets 21 and 22 and plate 19 and insert a new length of tube 23.

From the foregoing it will be apparent that I have devised an improved towing apparatus for connecting a trailer to a tractor and one in which I have minimized looseness due to wear of the parts. The apparatus is extremely simple of manufacture and lends itself readily to mass production methods of fabrication.

While I have shown my invention in but one form, it will be obvious to those skilled in the art that it is not so limited, but is susceptible of various changes and modifications without departing from the spirit thereof, and, I desire therefore, that only such limitations shall be placed thereupon as are specifically set forth in the appended claims.

What I claim is:

1. The combination with towing apparatus for connecting a trailer to a tractor embodying a fifth wheel plate, of laterally spaced brackets depending from the underside of the fifth wheel plate near the sides thereof, a continuous length of tube secured in the brackets and with the ends thereof projecting outwardly of the brackets, a depending portion on the fifth wheel plate intermediate the ends of the tube to which the tube is secured, other brackets fixedly mounted on the tractor having socket portions disposed adjacent the ends of and in axial alignment with the tube, a shaft rotatably mounted in the tube and with its ends projecting into the sockets, and means securing the shaft non-rotatably in the sockets.

2. In apparatus for connecting a trailer to a tractor, a fifth wheel plate, laterally spaced brackets depending from the plate, a continuous length of tube passing through the brackets and secured against rotation relative to the plate, other brackets disposed outwardly of the first named brackets mounted on the tractor and having tubular sockets axially aligned with the tube, a continuous shaft passing rotatably through the tube and with its ends projecting into the sockets, removable means on the sockets securing the shaft non-rotatably therein, a grease fitting on the tube through which grease is supplied to the inside thereof, sleeve like grease seals surrounding and secured to the adjacent ends of the tube and sockets, and rings of flexible material in the sleeves surrounding the tube with a grease retaining fit.

JOHN P. K. FONTAINE.

References Cited in the file of this patent
UNITED STATES PATENTS

| Number | Name | Date |
| --- | --- | --- |
| 1,380,490 | Masury | June 7, 1921 |
| 1,927,891 | Greer | Sept. 26, 1933 |
| 2,289,079 | Seyferth | July 7, 1942 |
| 2,306,459 | Mennen | Dec. 29, 1942 |
| 2,372,943 | Fontaine et al. | Apr. 3, 1945 |
| 2,518,338 | Lampe | Aug. 8, 1950 |
| 2,553,959 | Cook et al. | May 22, 1951 |
| 2,610,069 | Ketel | Sept. 9, 1952 |
| 2,615,763 | Wolford | Oct. 28, 1952 |